US009850099B2

(12) United States Patent
Hoopes et al.

(10) Patent No.: US 9,850,099 B2
(45) Date of Patent: Dec. 26, 2017

(54) SKIRT FOR PASSENGER CONVEYER

(71) Applicants: OTIS ELEVATOR COMPANY, Farmington, CT (US); Bruce E. Hoopes, Weat Hartford, CT (US); Gero Gschwendtner, Pressbaum (AT); Daniel Rush, Canton, CT (US); Bernward Engelke, Vienna (AT); Qingdong Jiang, Guangzhou, Guangdong (CN); Yanying Chen, Guangzhou, Guangdong (CN)

(72) Inventors: Bruce E. Hoopes, West Hartford, CT (US); Gero Gschwendtner, Pressbaum (AT); Daniel Rush, Canton, CT (US); Bernward Engelke, Vienna (AT); Qingdong Jiang, Guangzhou (CN); Yanying Chen, Guangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/321,827

(22) PCT Filed: Jun. 30, 2014

(86) PCT No.: PCT/CN2014/081128
§ 371 (c)(1),
(2) Date: Dec. 23, 2016

(87) PCT Pub. No.: WO2016/000118
PCT Pub. Date: Jan. 7, 2016

(65) Prior Publication Data
US 2017/0129744 A1 May 11, 2017

(51) Int. Cl.
*B65G 23/12* (2006.01)
*B66B 23/12* (2006.01)
*B66B 29/02* (2006.01)

(52) U.S. Cl.
CPC .............. *B66B 23/12* (2013.01); *B66B 29/02* (2013.01)

(58) Field of Classification Search
CPC .......... B66B 23/12; B66B 29/02; B66B 29/04
(Continued)

(56) References Cited

U.S. PATENT DOCUMENTS 3,986,595 A 10/1976 Asano et al.
4,397,383 A 8/1983 James
(Continued)

FOREIGN PATENT DOCUMENTS

CN 1096271 A 12/1994
CN 102838030 A 12/2012
(Continued)

OTHER PUBLICATIONS

International Search Report and Written Opinion for application PCT/CN2014/081128, dated Dec. 30, 2014, 15 pages.

*Primary Examiner* — Gerald McClain
*Assistant Examiner* — Keith R Campbell
(74) *Attorney, Agent, or Firm* — Cantor Colburn LLP

(57) ABSTRACT

A passenger conveyor includes a first stationary structure and a second stationary structure; a step positioned between the first stationary structure and the second stationary structure, the step has a tread with a tread surface; and a skirt secured to the step between the step and the first stationary structure, the skirt includes an upper tread edge; wherein the upper tread edge extends beyond the tread surface by at least about 10 mm.

22 Claims, 4 Drawing Sheets

(58) Field of Classification Search
USPC .......................................................... 198/333
See application file for complete search history.

(56) References Cited

U.S. PATENT DOCUMENTS

| | | | | |
|---|---|---|---|---|
| 4,413,719 | A | 11/1983 | White | |
| 4,570,781 | A * | 2/1986 | Kappenhagen | B66B 23/12 198/333 |
| 4,638,901 | A | 1/1987 | Lunardi | |
| 4,805,757 | A | 2/1989 | Wilcox | |
| 4,858,745 | A * | 8/1989 | Haas | B66B 23/12 198/333 |
| 5,082,102 | A | 1/1992 | Reichmuth | |
| 5,242,042 | A * | 9/1993 | Mauldin | B66B 23/12 198/333 |
| 5,560,468 | A | 10/1996 | Inoue | |
| 6,213,278 | B1 | 4/2001 | Tanigawa | |
| 7,264,105 | B2 * | 9/2007 | Illedits | B66B 23/12 198/326 |

FOREIGN PATENT DOCUMENTS

| | | | |
|---|---|---|---|
| CN | 102992161 | A | 3/2013 |
| WO | 2012085957 | A1 | 6/2012 |

* cited by examiner

SKIRT FOR PASSENGER CONVEYER

FIELD OF INVENTION

The subject matter disclosed herein relates generally to passenger conveyors, and more particularly to a skirt for use with a passenger conveyor.

BACKGROUND

Conventional passenger conveyors, such as escalators or moving walkways, include a chain of steps that travel in a loop to provide continuous movement along a specified path. There is inherently relative motion between the moving steps and the stationary structure of the conveyor system. One issue presented by passenger conveyor systems is the possibility for objects being caught between the moving steps and the stationary structure.

Various attempts have been made at minimizing or eliminating the possibility for objects to become caught at the interface between moving parts in a conveyor system. Stationary skirt panels do not eliminate relative motion, although they do cover some of the conveyor system components. Movable skirt panels have also been proposed. There is a need for an arrangement that guards against the possibility for objects to become caught or entrapped at the interface of moving parts and stationary system structure in a conveyor system.

BRIEF SUMMARY

According to an exemplary embodiment, a passenger conveyor includes a first stationary structure and a second stationary structure; a step positioned between the first stationary structure and the second stationary structure, the step having a tread with a tread surface; and a skirt secured to the step between the step and the first stationary structure, the skirt including an upper tread edge; wherein the upper tread edge extends beyond the tread surface by at least about 10 mm.

Alternatively or additionally in this or other embodiments, the upper tread edge extends beyond the tread surface by about 10 mm to about 30 mm.

Alternatively or additionally in this or other embodiments, the upper tread edge extends beyond the tread surface by about 15 mm.

Alternatively or additionally in this or other embodiments, the step includes a riser with a riser surface.

Alternatively or additionally in this or other embodiments, the skirt includes a front riser edge, the front riser edge extends beyond the riser surface by at least about 10 mm.

Alternatively or additionally in this or other embodiments, the front riser edge extends beyond the riser surface by about 10 mm to about 30 mm.

Alternatively or additionally in this or other embodiments, the front riser edge extends beyond the riser surface by about 25 mm.

Alternatively or additionally in this or other embodiments, the skirt is integrally formed with the step.

Alternatively or additionally in this or other embodiments, the skirt is fastened to the step.

According to another exemplary embodiment, a passenger conveyor step includes a tread with a tread surface; and a skirt secured to the step, the skirt including an upper tread edge; wherein the upper tread edge extends beyond the tread surface by at least about 10 mm.

Alternatively or additionally in this or other embodiments, the upper tread edge extends beyond the tread surface by about 10 mm to about 30 mm.

Alternatively or additionally in this or other embodiments, the upper tread edge extends beyond the tread surface by about 15 mm.

Alternatively or additionally in this or other embodiments, the step includes a riser with a riser surface.

Alternatively or additionally in this or other embodiments, the skirt includes a front riser edge, the front riser edge extends beyond the riser surface by at least about 10 mm.

Alternatively or additionally in this or other embodiments, the front riser edge extends beyond the riser surface by about 10 mm to about 30 mm.

Alternatively or additionally in this or other embodiments, the front riser edge extends beyond the riser surface by about 25 mm.

Alternatively or additionally in this or other embodiments, the skirt is integrally formed with the step.

Alternatively or additionally in this or other embodiments, the skirt is fastened to the step.

According to another exemplary embodiment, a passenger conveyor includes a first stationary structure and a second stationary structure; a step positioned between the first stationary structure and the second stationary structure, the step having a tread with a tread surface and a riser with a riser surface; and a skirt secured to the step between the step and the first stationary structure, the skirt including an upper tread edge and a front riser edge; wherein the front riser edge extends beyond the riser surface by at least about 10 mm.

According to another exemplary embodiment, a passenger conveyor step includes a tread with a tread surface and a riser with a riser surface; and a skirt secured to the step, the skirt including a front riser edge; wherein the front riser edge extends beyond the riser surface by at least about 10 mm.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
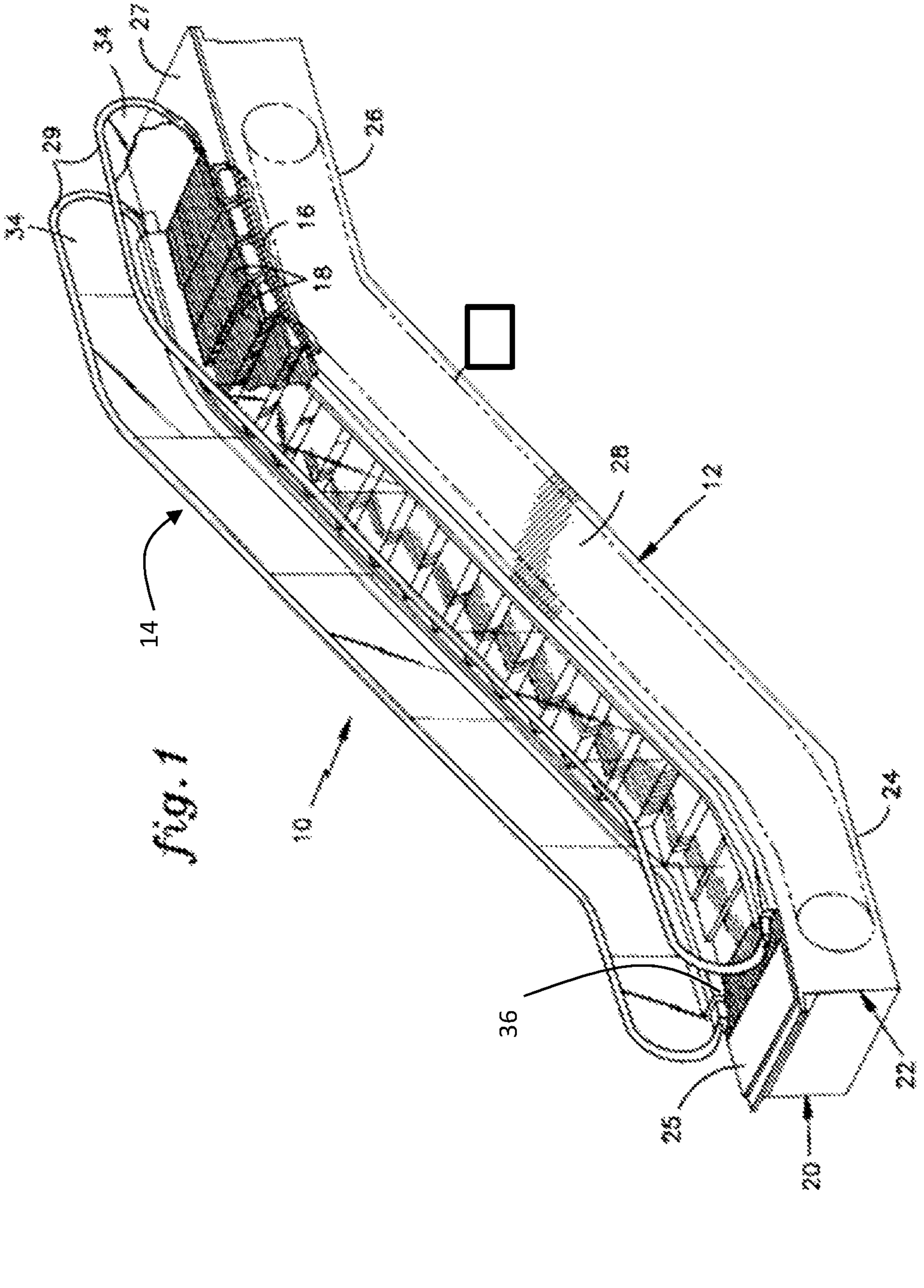
FIG. 1 depicts an escalator in an exemplary embodiment.

Embodiments relate to passenger conveyor systems, such as escalators or moving walkways. FIG. 1 depicts an escalator 10 in an exemplary embodiment. Escalator 10 includes a frame 12, a drive (not shown), a pair of balustrades 14, a step chain 16, and a plurality of steps 18 attached to the step chain 16. The frame 12 comprises a truss section 20, 22 on both the left and right hand sides of the frame, respectively. Each truss section 20, 22 has two end sections 24,26 parallel to one another, connected by an inclined midsection 28. The end sections 24, 26 form landings 25, 27 at the two elevations. The balustrades 14, comprising handrails 29, skirt panels 36, and balustrade panels 34 are attached to the truss sections 20, 22 as is known in the art. The skirt panels 36 (if equipped) and/or balustrade panels 34 on each side provide stationary structures. Steps 18 travel relative to the stationary structures.

Figure 2:
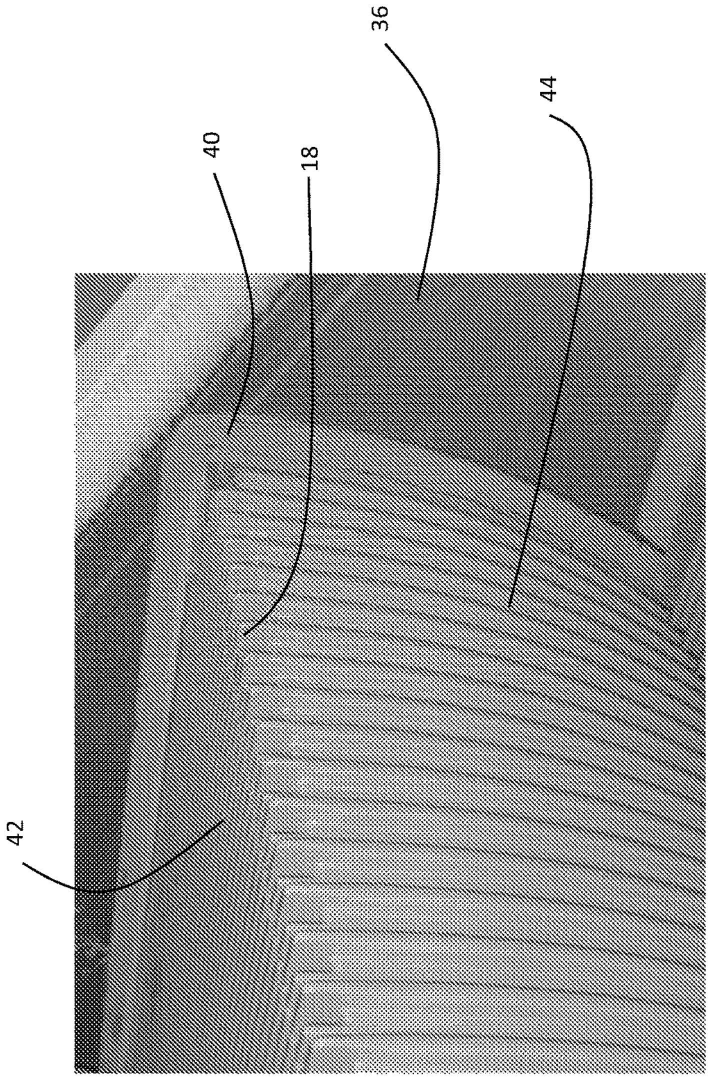
FIG. 2 depicts a step with a skirt in an exemplary embodiment.

One or more of steps 18 may include a skirt on the left and right sides of step 18. FIG. 2 depicts a step 18 having a skirt 40 positioned at the right side of the step 18. Step 18 includes a tread 42 having a tread surface and a riser 44 having a riser surface. Skirt 40 is positioned between step 18 and a stationary structure in the form of skirt panel 36. Skirt 40 is secured to step 18 and moves along with step 18. Skirt 40 serves to reduce or eliminate the possibility for objects to become caught at the interface between step 18 and stationary structure in the form of skirt panel 36. Skirt 40 may be made from a metal (e.g., steel, aluminum) or a polymeric material. Skirt 40 may be attached to step 18 (e.g., by fasteners) or may be integrally formed along with step 18, for example, by casting step 18 and skirt 40 simultaneously.

Figure 3:
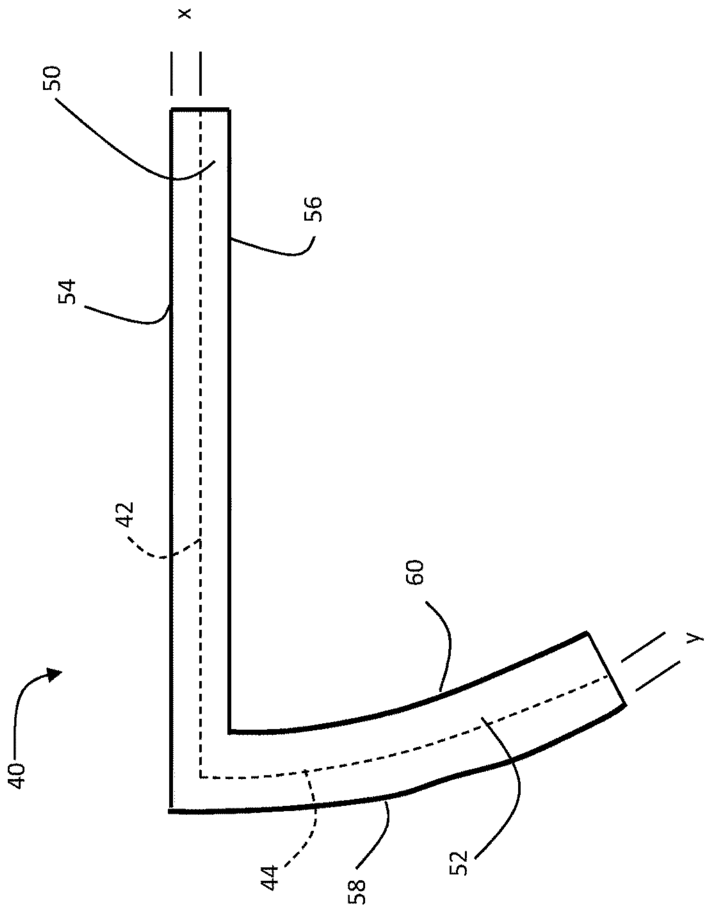
FIG. 3 depicts a skirt in an exemplary embodiment.

Referring to FIG. 3, skirt 40 has a tread portion 50 and a riser portion 52. Tread portion 50 includes an upper tread edge 54 and a lower tread edge 56. Riser portion 52 includes a front riser edge 58 and a rear riser edge 60. In the embodiment of FIGS. 2 and 3, upper tread edge 54 extends beyond tread surface 42 of step 18 by a distance x. Tread surface 42 of step 18 is shown by a dashed line in FIG. 3. In exemplary embodiments, x is at least about 10 mm. In other exemplary embodiments, x ranges from about 10 mm to about 30 mm. In other exemplary embodiments, x is about 15 mm. The value for x is selected to have a minimum height to prevent typical footwear from being pinched between step 18 and skirt panel 36 and a maximum height to avoid interference between the upper tread edge 54 and skirt brushes mounted to skirt panel 36.

In the embodiment of FIGS. 2 and 3, front riser edge 58 extends beyond riser surface 44 of step 18 by a distance y. Riser surface 44 of step 18 is shown by a dashed line in FIG. 3. In exemplary embodiments, y is at least about 10 mm. In other exemplary embodiments, y ranges from about 10 mm to about 30 mm. In other exemplary embodiments, y is about 25 mm.

Figure 4:
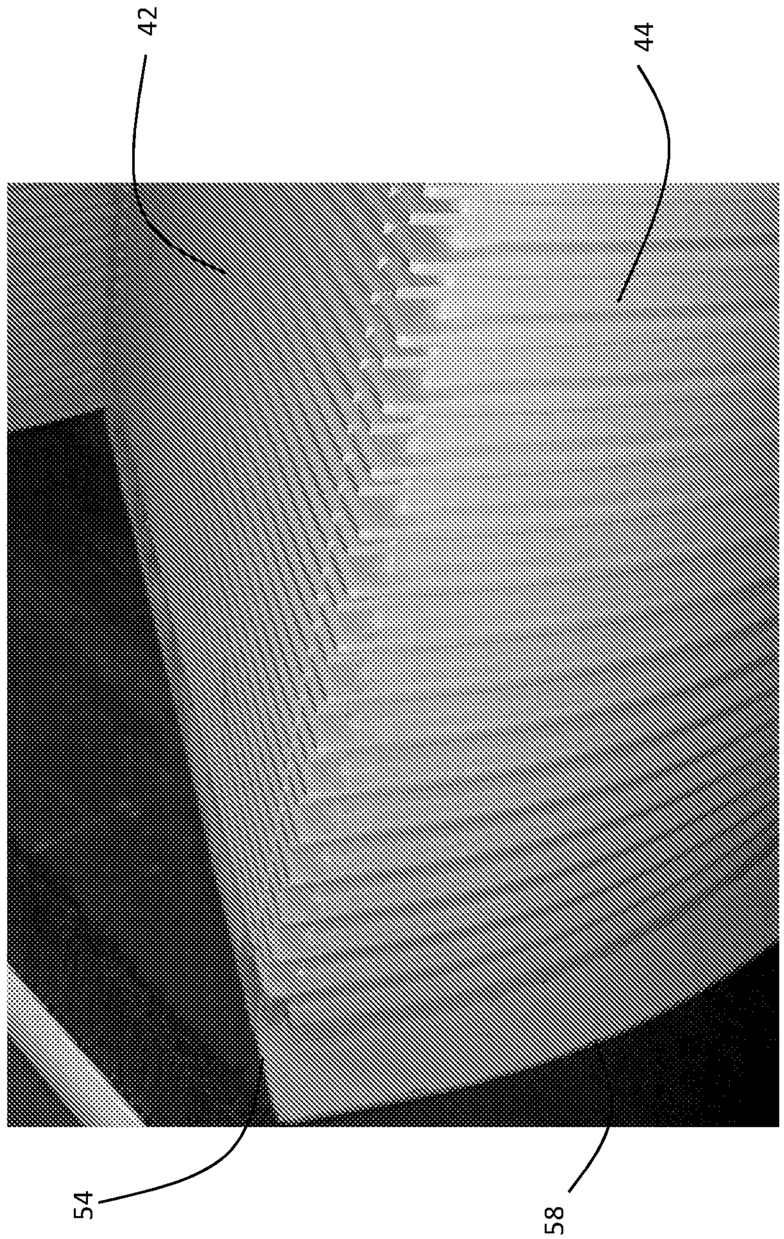
FIG. 4 depicts a step with a skirt in an exemplary embodiment.

In the embodiment shown in FIG. 2, upper tread edge 54 extends beyond tread surface 42 of step 18 by about 15 mm and front riser edge 58 extends beyond riser surface 44 of step 18 by a distance about 15 mm. Referring to FIG. 3, both x and y are about 15 mm. In other embodiments, the values for x and y may be different. Further, one of x and y may be zero. FIG. 4 depicts an alternate embodiment where upper tread edge 54 is aligned with the tread surface 42 (e.g., x is zero) and front riser edge 58 extends beyond riser surface 44 (e.g., by about 25 mm). Thus, embodiments may include only one of the upper tread edge 54 and the front riser edge 58 extending beyond a respective surface of step 18. Embodiments also include both the upper tread edge 54 and the front riser edge 58 extending beyond a respective surface of step 18, by equal or different distances.

Although the upper tread edge 54 and the front riser edge 58 are shown as being parallel to the tread surface 42 and riser surface 44, respectively, in alternate embodiments, the upper tread edge 54 and the front riser edge 58 need not be parallel to the tread surface 42 and riser surface 44, respectively. The distance x in FIG. 3 may vary along the length of upper tread edge 54. The distance y in FIG. 3 may vary along the length of front riser edge 58.

Although embodiments have been described with reference to an escalator, the skirt may also be used in other passenger conveyor systems, such as a moving walkway. When used with a moving walkway, the skirt has an upper tread edge that extends above the tread surface of the moving walkway step by a distance z. In exemplary embodiments, z is at least about 10 mm. In other exemplary embodiments, z ranges from about 10 mm to about 30 mm. In other exemplary embodiments, z is about 15 mm. The value for z is selected to have a minimum height to prevent typical footwear from being pinched between the step and the skirt panel and a maximum height to avoid interference between the upper tread edge and skirt brushes mounted to skirt panel. When employed in a moving walkway, the skirt does not include a riser portion.

Embodiments mitigate the entrapment risk between the step tread and stationary structure (e.g., for escalators or moving walkways) and/or the step riser and the stationary structure (e.g., for escalators).

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description, but is only limited by the scope of the appended claims.

The invention claimed is:

1. A passenger conveyor comprising:

a first stationary structure and a second stationary structure;

a step positioned between the first stationary structure and the second stationary structure, the step having a tread with a tread surface; and a skirt secured to the step between the step and the first stationary structure, the skirt including an upper tread edge;

wherein the upper tread edge extends beyond the tread surface by at least about 10 mm.

2. The passenger conveyor of claim 1 wherein:

the upper tread edge extends beyond the tread surface by about 10 mm to about 30 mm.

3. The passenger conveyor of claim 2 wherein:

the upper tread edge extends beyond the tread surface by about 15 mm.

4. The passenger conveyor of claim 1 wherein:

the step includes a riser with a riser surface.

5. The passenger conveyor of claim 4 wherein:

the skirt includes a front riser edge, the front riser edge extends beyond the riser surface by at least about 10 mm.

6. The passenger conveyor of claim 5 wherein:

the front riser edge extends beyond the riser surface by about 10 mm to about 30 mm.

7. The passenger conveyor of claim 6 wherein:

the front riser edge extends beyond the riser surface by about 25 mm.

8. The passenger conveyor of claim 5 wherein:

upper tread edge extends beyond the tread surface by a first distance and the front riser edge extends beyond the riser surface by a second distance, the first distance and the second distance being unequal.

9. The passenger conveyor of claim 1 wherein:

the skirt is integrally formed with the step.

10. The passenger conveyor of claim 1 wherein:

the skirt is fastened to the step.

11. A passenger conveyor step comprising:

a tread with a tread surface; and a skirt secured to the step, the skirt including an upper tread edge;

wherein the upper tread edge extends beyond the tread surface by at least about 10 mm.

12. The passenger conveyor step of claim 11 wherein:

the upper tread edge extends beyond the tread surface by about 10 mm to about 30 mm.

13. The passenger conveyor step of claim 12 wherein:

the upper tread edge extends beyond the tread surface by about 15 mm.

14. The passenger conveyor step of claim 11 wherein:

the step includes a riser with a riser surface.

15. The passenger conveyor step of claim 14 wherein:

the skirt includes a front riser edge, the front riser edge extends beyond the riser surface by at least about 10 mm.

16. The passenger conveyor step of claim 15 wherein:

the front riser edge extends beyond the riser surface by about 10 mm to about 30 mm.

17. The passenger conveyor step of claim 16 wherein:

the front riser edge extends beyond the riser surface by about 25 mm.

18. The passenger conveyor of claim 15 wherein:

the upper tread edge extends beyond the tread surface by a first distance and the front riser edge extends beyond the riser surface by a second distance, the first distance and the second distance being unequal.

19. The passenger conveyor step of claim 11 wherein:

the skirt is integrally formed with the step.

20. The passenger conveyor step of claim 11 wherein:

the skirt is fastened to the step.

21. A passenger conveyor comprising:

a first stationary structure and a second stationary structure;

a step positioned between the first stationary structure and the second stationary structure, the step having a tread with a tread surface and a riser with a riser surface; and a skirt secured to the step between the step and the first stationary structure, the skirt including a front riser edge;

wherein the front riser edge extends beyond the riser surface by at least about 10 mm.

22. A passenger conveyor step comprising:

a tread with a tread surface and a riser with a riser surface; and a skirt secured to the step, the skirt including a front riser edge;

wherein the front riser edge extends beyond the riser surface by at least about 10 mm.

* * * * *